United States Patent [19]

Courter

[11] Patent Number: 4,875,645
[45] Date of Patent: Oct. 24, 1989

[54] MODULAR CARGO CONVEYOR AND RESTRAINT SYSTEM FOR AIRCRAFT

[75] Inventor: Jack P. Courter, Seattle, Wash.
[73] Assignee: The Boeing Company, Seattle, Wash.
[21] Appl. No.: 272,128
[22] Filed: Nov. 14, 1988

Related U.S. Application Data

[62] Division of Ser. No. 69,518, Jul. 2, 1987, Pat. No. 4,824,050.

[51] Int. Cl.$^4$ .......................... B64C 1/20; B64D 9/00
[52] U.S. Cl. .............................. 244/137.1; 244/118.1; 414/532
[58] Field of Search ............... 244/118.1, 118.2, 137.1, 244/137.3; 410/92; 414/529, 532, 536; 193/35 R

[56] References Cited

U.S. PATENT DOCUMENTS

| | | | |
|---|---|---|---|
| 2,334,124 | 11/1943 | Peterson | 214/83 |
| 2,833,501 | 5/1958 | Evans | 248/120 |
| 3,251,489 | 5/1966 | Davidson | 214/84 |
| 3,357,372 | 12/1967 | Bader | 105/369 |
| 3,381,921 | 5/1968 | McDonough et al. | 244/118 |
| 3,415,480 | 12/1968 | Sertich | 414/536 |
| 3,430,586 | 3/1969 | Oswald | 108/55 |
| 3,472,363 | 10/1969 | Rustin, Jr. et al. | 206/46 |
| 3,480,239 | 11/1969 | Jensen et al. | 244/118 |
| 3,741,504 | 6/1973 | Alberti et al. | 244/137 R |
| 3,753,407 | 8/1973 | Tilseth | 108/53 |
| 3,759,476 | 9/1973 | Goodwin | 248/361 R |
| 3,899,092 | 8/1975 | Nordstrom | 214/84 |
| 3,906,870 | 9/1975 | Alberti | 105/464 |
| 4,000,870 | 1/1977 | Davies | 244/118 R |
| 4,077,590 | 3/1978 | Shorey | 244/118 R |
| 4,134,345 | 1/1979 | Baldwin et al. | 105/366 B |
| 4,382,733 | 5/1983 | Rodgers | 410/49 |
| 4,462,493 | 7/1984 | Nordstrom | 193/35 R |

FOREIGN PATENT DOCUMENTS

| | | | |
|---|---|---|---|
| 106591 | 4/1984 | European Pat. Off. | 244/118.2 |
| 1062462 | 4/1954 | France | 244/118.1 |
| 2169256 | 7/1986 | United Kingdom | 244/118.1 |

OTHER PUBLICATIONS

"Intermodal Modules for Transport"; Boeing Commercial Airplane Company, D6-34500—R2; Nov. 1984.

Primary Examiner—Joseph F. Peters, Jr.
Assistant Examiner—Rodney Corl
Attorney, Agent, or Firm—Joan H. Pauly

[57] ABSTRACT

Modules (30) include lateral bearing beams (32) for distributing cargo loads over a cargo compartment floor (4). Roller trays (34, 34′, 34″) are secured to and extend longitudinally between the beams (32). A tiedown support beam (38) is secured to and extends longitudinally between outboard portions of adjacent bearing beams (32). The support beam (38) is anchored to a rail (12) mounted in the floor (4). A side guide (40) is attached to of the bearing beams (32) and carries vertical restraint members (46) and a longitudinal restraint latch (48). Adjacent modules (30) are connected by slip joints (68). A cargo tray (80) has sloping sides (86) to conform to curving cargo compartment sidewalls (6). Slots (102) on the sides (86) engage the restraint members (46). The tray (80) has an outer shell (82) and a corrugated inner shell (90) with ridges which form support surfaces (98) coplanar with a peripheral horizontal lip (106). Spans between ridges (98) and the lip (106) are dimensioned to support standard size boxes.

12 Claims, 7 Drawing Sheets

MODULAR CARGO CONVEYOR AND RESTRAINT SYSTEM FOR AIRCRAFT

This application is a division of application Ser. No. 069,518, filed July 2, 1987, now U.S. Pat. No. 4,824,050.

DESCRIPTION

1. Technical Field

This invention relates to aircraft cargo conveyor and restraint systems and, more particularly, to such a system having modules in which roller trays are supported by lateral bearing beams that distribute cargo loads over the cargo compartment floor and are anchored to the floor by outboard longitudinally extending support beams.

2. Background Art

In current standard body width aircraft, such as the Boeing 737 and 757, the lower cargo compartments are primarily loaded by a bulk loading procedure. Bulk loading of individual nonstandard size pieces of cargo increases the number of pieces of cargo that must be handled between the aircraft and the freight terminal, requires a relatively large number of ramp cargo handlers, and is very time consuming. All of these factors increase the cost of cargo handling, and the relatively long turn-around time for aircraft loading and unloading prevents maximum utilization of the aircraft. In addition, the lower cargo compartments in this type of aircraft have low compartment heights, forty-four to fifty-four inches, making moving cargo within the compartment difficult and even more time consuming. The combination of the difficulty in moving within the compartment and the large number of nonstandard size cargo pieces results in relatively inefficient use of the available cargo volume within the compartment.

An alternative to bulk loading is a conveyor system for handling containerized or pallet-mounted cargo. Such systems may take various forms In one type of system, roller trays are located within recesses in the cargo compartment floor structure and pivot outwardly into a position for supporting cargo during the loading procedure. Another type of system has an electrically powered continuous belt installed within the aircraft for moving cargo units. In a third type of system, bulk cargo is loaded into telescoping bins which are built into the secondary structure of the aircraft. Each of these types of systems requires a sizable amount of interface between the aircraft systems and structure and the conveyor system during the manufacture of the aircraft. Therefore, the cost of providing the aircraft with the system is relatively high and retrofitting existing aircraft is at best impractical.

Cargo conveyor and restraint systems for aircraft are disclosed in French Patent No. 1,062,462, granted to M. Henry and published on Apr. 23, 1954 and in U.S. Pat. Nos. 2,334,124, granted Nov. 9, 1943, to C. G. Peterson; 3,251,489, granted May 17, 1966, to R. W. Davidson; 3,357,372, granted Dec. 12, 1967, to H. E. Bader: 3,381,921, granted May 7, 1968, to F. M. McDonough et al.; 3,480,239, granted Nov. 25, 1969, to R. H. Jensen et al.; 3,741,504, granted June 26, 1973, to J. Alberti et al.; 3,899,092, granted Aug. 12, 1975, to A. B. Nordstrom; 3,906,870, granted Sept. 23, 1975, to J. Alberti; 4,000,870, granted Jan. 4, 1977, to D. J. Davies; and 4,077,590, granted Mar. 7, 1978, to T. H. Shorey. Latching mechanisms for cargo systems are disclosed in U.S. Pat. Nos. 3,759,476, granted Sept. 18, 1973, to W. H. Goodwin, and 4,134,345, granted Jan. 16, 1979, to F. G. Baldwin et al. U.S. Pat. No. 4,462,493, granted July 31, 1984, to A. B. Nordstrom, discloses a roller rail assembly for a cargo loading system.

The Davidson patent discloses a system in which several longitudinal lines of roller trays are directly attached to the floor structure of the cargo compartment. The outboard trays carry side guides which are laterally adjustable to accommodate different sized pallets. The trays in each of the lines carry vertical and longitudinal restraints.

The Bader system includes two lines of rollers and opposite outboard rails. The rows of rollers and the rails are each separately mounted directly to the floor. The rails carry latches and engage the edges of a pallet in slots to restrain the pallet.

Jensen et al. disclose a convertible cargo/passenger system having a plurality of lines of roller assemblies attached directly to the floor structure. Opposite side guides are also attached to the floor structure and to a carpet support. The roller assemblies and side guides in each line are longitudinally spaced, and latches are mounted to the floor between roller assemblies and between side guides. The side guide members carry rollers and have an outboard supporting leg.

Alberti et al. disclose an apparently permanent system having power driven conveyor wheels. The system includes side assemblies having cargo restraint locks and vertically facing guide rollers. The side locks permit limited fore and aft sliding movement of containers to maintain the flexibility of the aircraft by ensuring that the container is not so rigidly attached that it becomes a part of the aircraft structure.

Nordstrom, U.S. Pat. No. 3,899,092, discloses a load carrying system for use when cargo units do not span two or more floor tracks. The purpose of the system is to avoid overloading lightweight floor panels. The system has modules each of which includes transverse beams that are attached to permanent floor tracks and longitudinal beams attached to the transverse beams. Both the longitudinal beams and the transverse beams are spaced above the floor. Separate roller tray units are supported on the floor between the beams by resilient elastomeric strips. The roller trays normally carry cargo loads and distribute the loads over the floor. Under high loads, the resilient strips compress, and cargo units bottom out on the longitudinal beams so that the longitudinal and transverse beams carry the load. Cargo restraint means is mounted on the longitudinal beams.

The Shorey system includes a plurality of longitudinally spaced lateral bars that are attached to the seat tracks. The lateral bars have tie-down brackets. Panels are attached to the lateral bars and are spaced above the floor. The panels carry retractable inboard and outboard guide rails, cargo restraints, and roller assemblies.

The above patents and the prior art that is discussed and/or cited therein should be studied for the purpose of putting the present invention into proper perspective relative to the prior art.

DISCLOSURE OF THE INVENTION

A subject of the invention is a cargo conveyor and restraint system in an aircraft compartment of the type having a floor and a plurality of anchor fittings mounted in the floor. According to an aspect of the invention, the system comprises a plurality of sections each of which includes a plurality of laterally extending, longitudinally aligned bearing beams for distributing cargo loads over the floor. A plurality of roller trays are secured to and extend longitudinally between the bearing beams. At least one tie-down support beam, laterally offset from the roller trays, is secured to and extends longitudinally between adjacent bearing beams. The support beam includes means for securing the section to the anchor fittings. Each section also has restraint means for restraining horizontal and vertical movement of cargo units positioned on the section. Preferably, the system includes two parallel longitudinally extending rows of sections and slip joint means connecting the sections in each row to each other. This arrangement facilitates installation and removal of the system from the aircraft and prevents aircraft body deflections from inducing loads in the system.

A feature of the invention is sections each of which comprises longitudinally extending side guide means secured to outboard end portions of the bearing beams. Preferably, a longitudinally extending side guide is secured to an outboard end portion of each bearing beam in the section. Another feature of the invention is restraint means that includes means carried by the side guide means for restraining longitudinal and vertical movement of cargo units positioned on the section.

According to another aspect of the invention, the roller trays, and preferably the side guide, are spaced above the floor. Bearing block means are removably attached to underside portions of the bearing beams and the tie-down support beam to transmit loads from the bearing beams and the tie-down support beam to the floor. The bearing block means is compressible under abnormal loads to help absorb abnormal loads. This arrangement provides an efficient distribution of cargo loads over the floor. In normal use conditions, the bearing block means remains uncompressed and does not require replacement. When an abnormal load condition occurs, the bearing block means compresses to help absorb the abnormal loads and thereby reduce the load on the conveyor and restraint system and the aircraft structure. Since the bearing block means is removably attached, it may easily and quickly be removed and replaced at the end of the flight during which the abnormal load condition occurs.

The system of the invention makes it possible to avoid the problems associated with bulk loading by providing a means for easily moving containerized or pallet-mounted cargo within the compartment. The cargo may be loaded onto various types of trays pallets and containers. The trays, containers, or pallets may be sized to permit the cargo loads to be easily moved manually. Thus, the system is suitable for use in cargo compartments in which movement is difficult (e.g. because of low compartment heights), as well as in larger compartments. The preferred embodiment of the system of the invention further facilitates handling of cargo by assisting the guiding of units into position and providing simple and effective means for reacting forward, lateral, and upward flight loads. An important advantage of the system of the invention is that it may be installed in existing aircraft without alteration or special provisioning of the aircraft structure. The system may be installed on the upper surface of the existing cargo compartment floor and attached to the existing anchor fittings in the floor. The simplicity of the structure of the system combined with the simple installation procedure make the system a highly economical and efficient solution to the previously encountered problem of inefficiency in cargo handling. The economic advantages of the system are further enhanced by the ease with which it can be maintained, repaired, or even replaced.

These and other advantages and features will become apparent from the detailed description of the best mode for carrying out the invention that follows.

BRIEF DESCRIPTION OF THE DRAWINGS

In the drawings, like element designations refer to like parts throughout, and.

BEST MODE FOR CARRYING OUT THE INVENTION

Figures 1, 5:
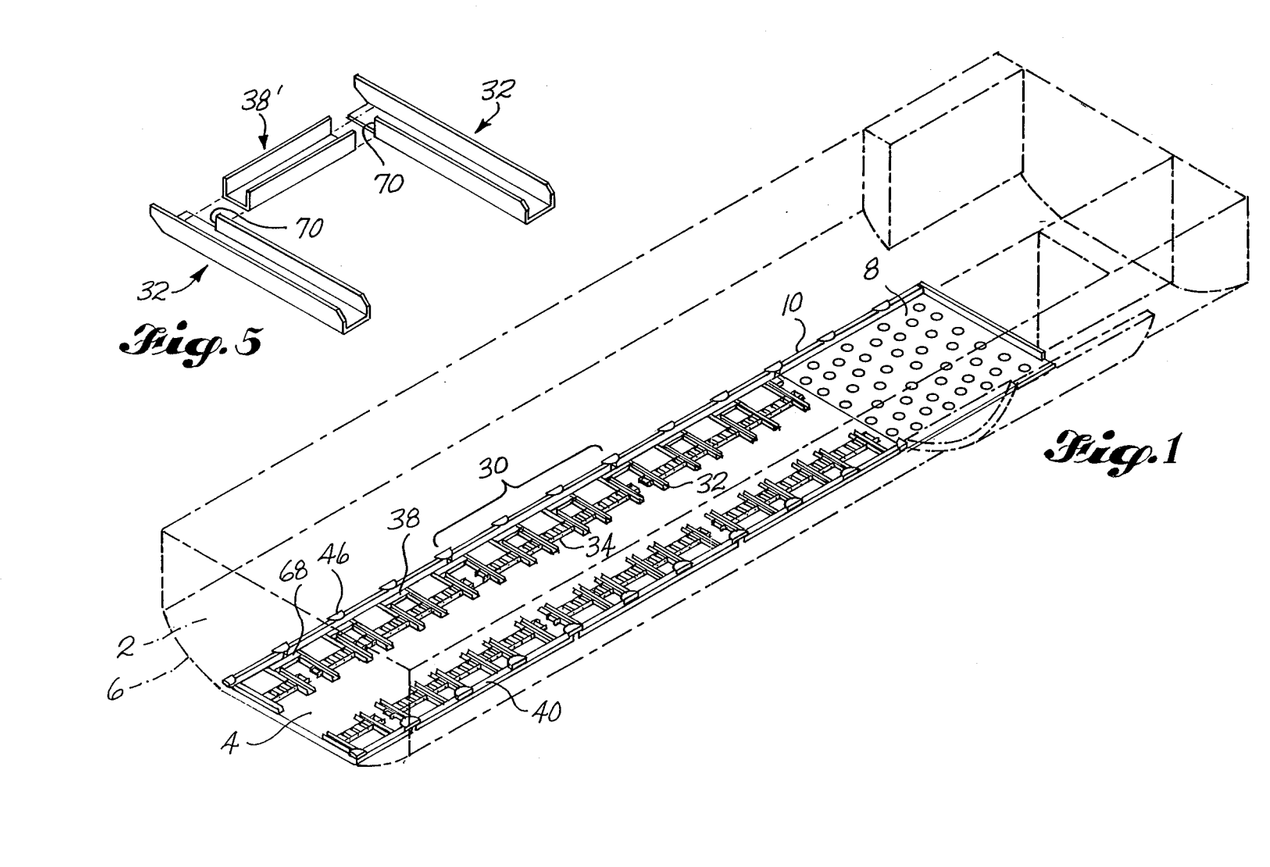
FIG. 1 is a pictorial view of the preferred embodiment of the cargo conveyor and restraint system of the invention installed in a lower cargo compartment of an aircraft, with the compartment shown in broken lines.
FIG. 5 is an exploded pictorial view of the slip joint connection.
Figure 3:
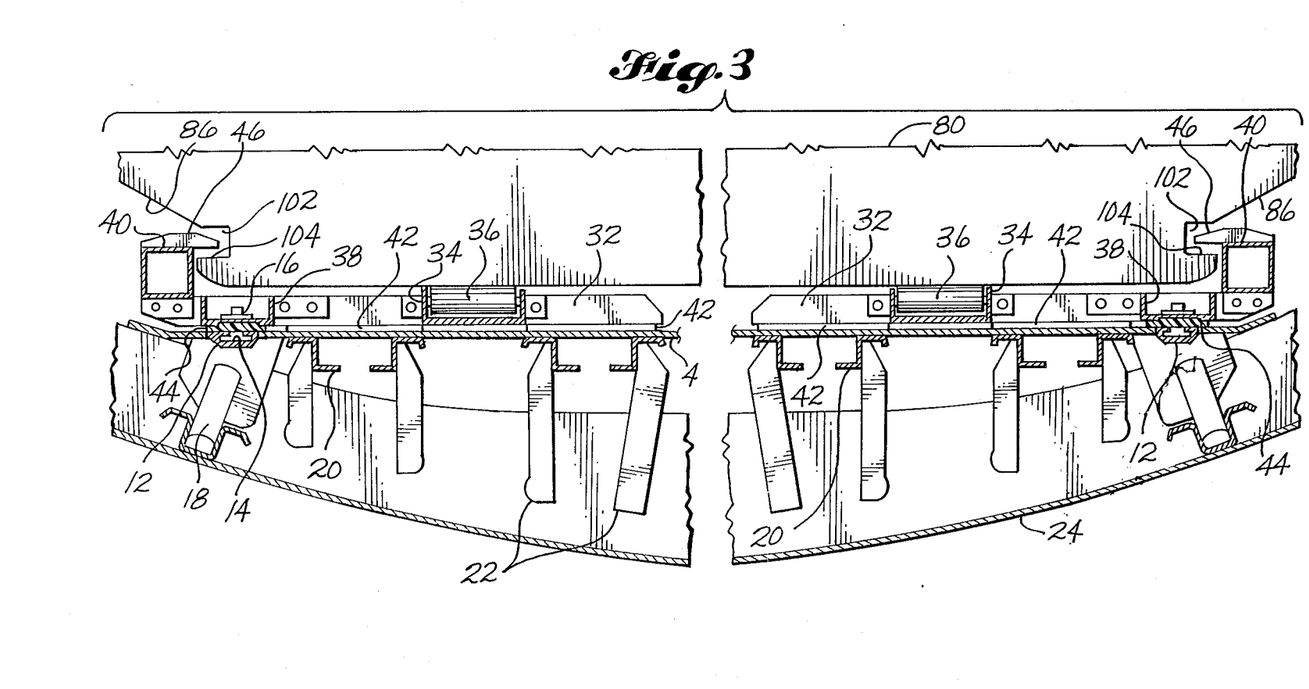
FIG. 3 is a cross-sectional view of the compartment and system shown in FIG. 1, with portions cut away and with a cargo tray being supported by the system.
Figure 8:
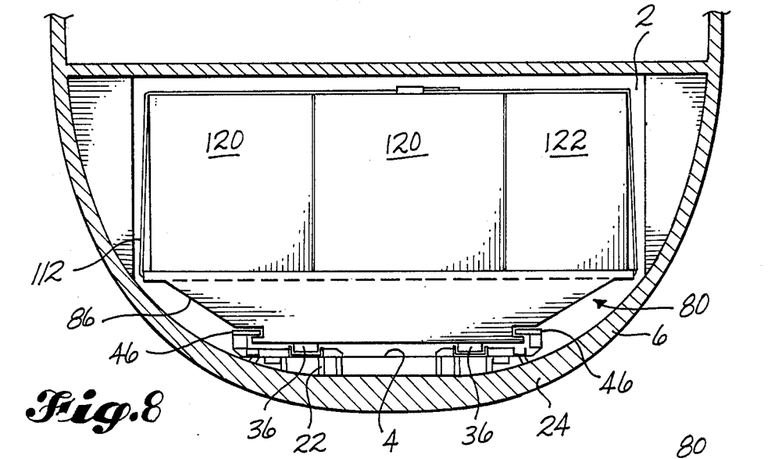
FIG. 8 is an end elevational view of the tray and load shown in FIGS. 6 and 7 being supported by the system of the invention in a lower cargo compartment, with the compartment shown in section.

The drawings show a cargo conveyor and restraint system that is constructed according to the invention and that also constitutes the best mode of the invention currently known to the applicant. FIGS. 1, 3, and 8 show the invention in use in a lower cargo compartment of an aircraft. It is anticipated that the system of the invention will be used primarily in this type of aircraft cargo compartment. However, it is of course to be understood that the apparatus of the invention may also be used to advantage in other types of cargo compartments.

FIGS. 1, 3, and 8 show the lower cargo compartment 2 of a standard body width aircraft. The compartment 2 has a floor 4 and sidewalls 6 that curve upwardly and outwardly from the floor 4. Referring to FIG. 1, a ballmat 8 of a known type is positioned by the compartment door to facilitate movement of cargo into the compartment 2 in a known manner. A side guide 10 may be provided in association with the ballmat 8.

FIG. 3 shows the support structure associated with the floor 4 of the compartment 2. Two longitudinally extending rails 12 are mounted in the opposite outboard portions of the floor 4. A plurality of anchor fittings 14 are formed in each of the rails 12. Each anchor fitting 14 is shaped to receive a tie-down fitting 16 of a known type to secure a panel or other structure to the floor 4. In FIG. 3, a tie-down fitting 16 is shown securing a tie-down support beam 38, described further below, to each of the rails 12. The floor 4 is supported by stringers 18 and Z-stringers 20. Support clips 22 connect the Z-stringers 20 to the aircraft body 24.

The cargo conveyor and restraint system of the invention comprises a plurality of sections, each of which is secured to an anchor fitting 14 in one of the rails 12. Preferably, the system has two parallel longitudinally extending rows of sections with a slip joint 68 connecting adjacent sections in each row to each other. The slip joint 68 prevents aircraft body deflections from inducing loads in the system. The sections of the system may vary in size and configuration. However, in order to minimize the cost of the system and maintain its versatility, it is preferable that as many of the sections as possible be in the form of identical modules 30.

Figure 2:
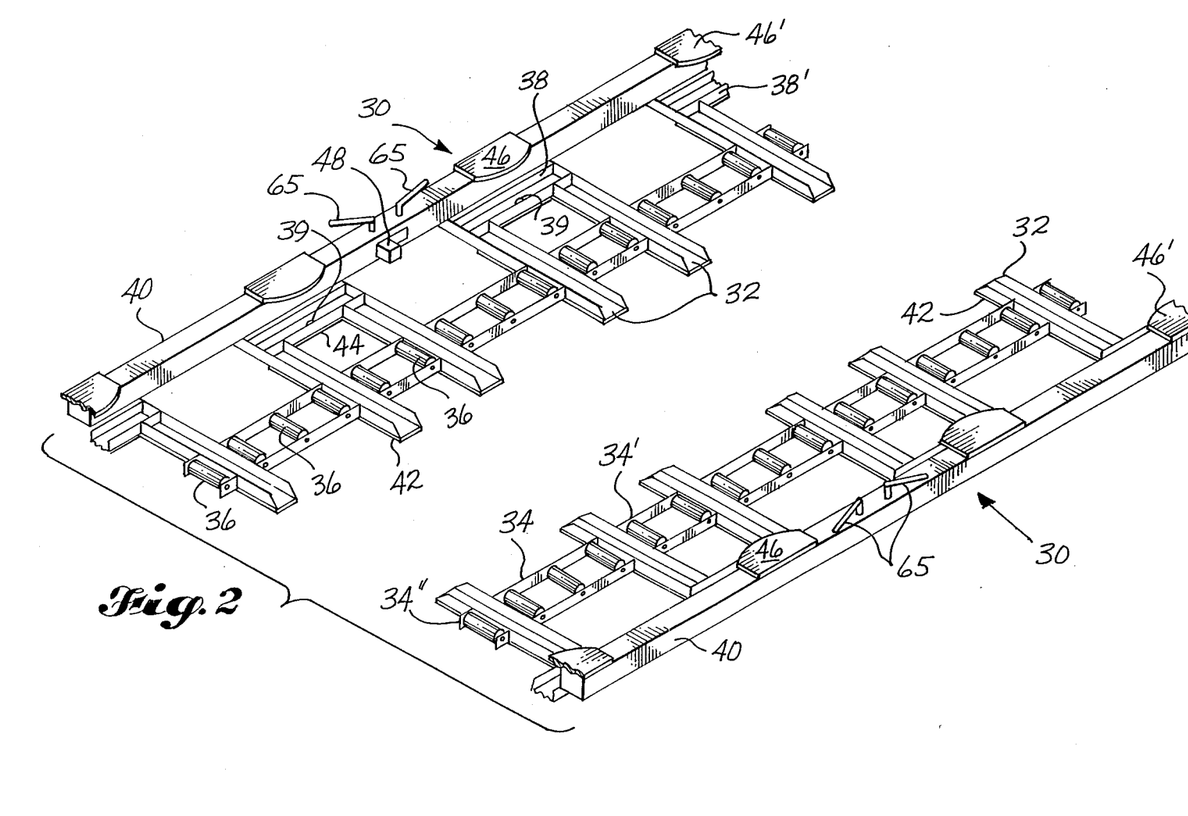
FIG. 2 is a pictorial view of two of the modules shown in FIG. 12.

FIG. 2 shows two modules 30. Each module 30 includes a plurality of laterally extending, longitudinally aligned bearing beams 32 for distributing cargo loads over the floor 4. A plurality of roller trays 34, 34' are secured to and extend longitudinally between the bearing beams 32. Rollers 36 are mounted on the roller trays 34, 34' in a known manner for supporting and aiding the positioning of cargo units. Each module 30 of the preferred embodiment shown in the drawings includes six bearing beams 32, three roller trays 34 each of which has mounted thereon three rollers 36, and two roller trays 34' which are positioned between the trays 34 and each of which has two rollers 36 mounted thereon. In addition to the roller trays 34, 34' that extend between bearing beams 32, a small roller tray 34" extends in a longitudinal direction from the outer face of the outer bearing 32 on each end of the module 30. As shown in FIGS. 1 and 2, all of the roller trays 34, 34', 34" are longitudinally aligned.

Each module 30 also includes two tie-down support beams 38 which are laterally offset from the roller trays 34, 34', 34" and are secured to and extend longitudinally between adjacent bearing beams 32. The support beams 38 extend between the outboard end portions of the bearing beams 32 between which the two-roller roller trays 34' extend. Each support beam 38 has an opening 39 extending vertically through its bottom wall for receiving a tie-down fitting 16 to secure the module 30 to an anchor fitting 14. In addition to providing a means for anchoring the module 30, the support beams 38 strengthen the structure of the module 30.

As shown in FIGS. 2 and 3, the bearing beams 32, roller trays 34, 34', 34", and support beams 38 are each formed from a metal channel. Preferably, the inboard ends of the bearing beams 32 are beveled and the outboard ends of the bearing beams 32 are truncated, as best seen in FIGS. 3 and 5. The beveled inboard ends help prevent injury to personnel and damage to cargo from sharp edges. The truncated outboard ends accommodate the sloping configuration of the lower portions of the compartment sidewalls 6 to maximize utilization of the space in the compartment 2.

Each module 30 further includes a longitudinally extending side guide 40 which is secured to an outboard end portion of each of the bearing beams 32 in the module 30. The positioning of the side guide 40 relative to the bearing beams 32 and the support beams 38 is best seen in FIGS. 2 and 3. As shown in FIG. 3, the preferred embodiment of the side guide 40 is formed from square metal tubing. The side guide 40, support beams 38, and roller trays 34, 34', 34" may be secured to the bearing beams 32 by any suitable means. For example, the members may be welded together, or they may be attached by fasteners, as illustrated in FIG. 3.

Cargo loads are transmitted to the floor 4 of the compartment 2 by the bearing beams 32 and the tie-down support beams 38. The roller trays 34, 34', 34" and the side guide 40 are spaced above the floor 4. Bearing blocks 42, 44 are removably attached to underside portions of the bearing beams 32 and tie-down support beams 38 to transmit loads from the beams 32, 38 to the floor 4. As shown in FIG. 3, two bearing blocks 42 are attached to the underside of each bearing beam 32 and are positioned above the Z-stringers 20 of the floor support structure. The bearing block 44 that is attached to the underside of each support beam 38 extends along the corresponding rail 12 to transmit loads to the rail 12. The block 44 has a suitable opening (not shown) for receiving the tie-down fitting 16.

Each bearing block 42, 44 is made from a strong compressible material, such as a phenolic composite material. The blocks 42, 44 remain uncompressed under normal flight loads. Under abnormal loads, the blocks 42, 44 compress to help absorb the abnormal loads and prevent damage to the conveyor and restraint system and the aircraft structure. The blocks 42, 44 are removably attached to the beams 32, 38 to permit easy replacement following the occurrence of an abnormal load condition. The preferred method of attachment is to simply countersink the blocks 42, 44 into the bottom walls or webs of the channel-shaped beams 32, 38. This is illustrated in relation to the blocks 44 in FIG. 3.

Figure 4:
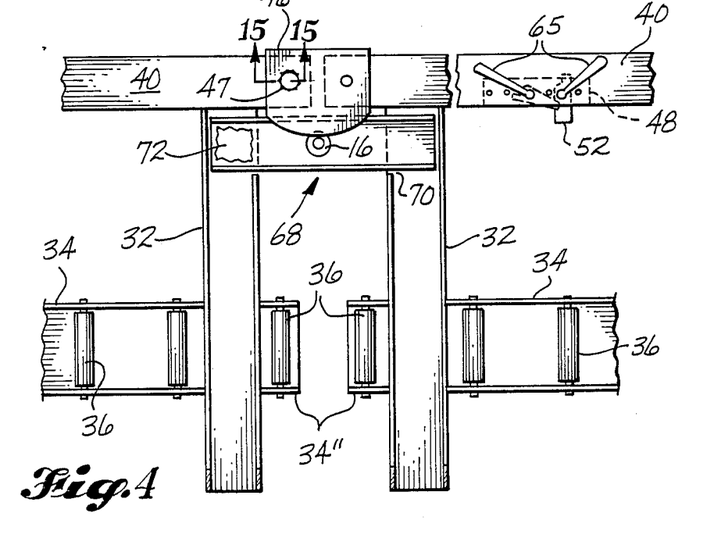
FIG. 4 is a fragmentary top plan view showing the preferred embodiment of the slip joint connecting two end portions of adjacent modules and the preferred embodiment of the longitudinal restraint latch.
Figure 15:
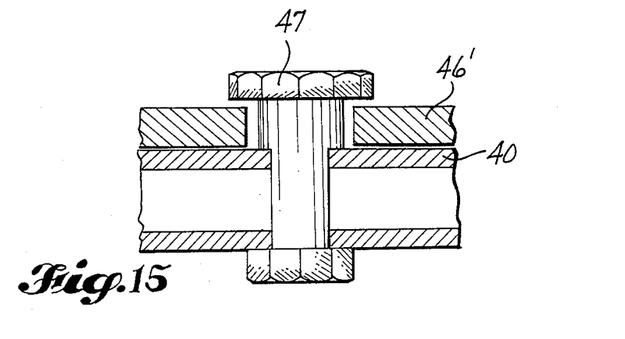
FIG. 15 is a sectional view taken along the line 15—15 in FIG. 4, with the shoulder bolt shown in elevation.

In the preferred embodiment of the system, the restraint means is carried by the side guides 40, which provide lateral, vertical, and longitudinal restraint. Lateral restraint is provided by the tubular bodies of the side guides 40, as shown in FIGS. 3 and 8. Vertical restraint is provided by aluminum plates 46, 46' which are mounted on the upper surface of the side guide 40 and project horizontally therefrom in an inboard direction. The plates 46, 46' are spaced along the side guide 40 with two plates 46 positioned on midportions of the side guide 40 and a plate 46' positioned on each end of the guide 40. This positioning of the plates 46, 46' vertically aligns them with the system tie-down locations. Adjacent ends of the side guides 40 on adjacent modules 30 share a single end plate 46' which is connected to each of the two side guides 40. One of the connections is accomplished by means of a shoulder bolt 47. The bolt 47 extends through a slot in the plate 46' to allow the plate 46' to slide longitudinally relative to the side guide 40. See FIG. 15. The plates 46, 46' are positioned to engage slots running longitudinally along lower outboard portions of cargo units. The outer (inboard) ends of the plates 46, 46' are curved for smooth engagement with cargo unit slots. The side guide 40 in each module 30 also includes a side lock or longitudinal restraint latch 48. The positioning of the lock 48 on the side guide 40 permits installation of the lock 48 at different longitudinal locations for restraining different types of cargo units. FIGS. 2 and 4 illustrate the side lock 48 in an engaged position in which it prevents longitudinal movement of a cargo unit which has been placed on the module 30. The structure of the side locks 48 is described in more detail below.

The slip joint 68 that connects adjacent modules 30 is illustrated in FIGS. 4 and 5. The slip joint 68 connects the lateral bearing beams 32 on the adjacent ends of the modules 30. Each of the adjacent bearing beams 32 has a notch 70 in its outer flange which faces the adjacent module 30. The opposite ends of a tie-down support beam 38' are received into the channels of the bearing beams 32 through the notches 70. A center portion of the bottom wall which forms the web of the support beam 38' is anchored to the corresponding rail 12 in the same manner that the support beams 38 within the modules 30 are anchored. The slip joint 68 closely resembles the connections between the support beams 38 and the bearing beams 32 within the modules 30, but the slip joint support beam 38' is not attached to the bearing beams 32. The beam 38' is slidable relative to the bearing beams 32, and there is clearance between the ends of beam 38' and the flanges of bearing beams 32, for example about ⅛ inch clearance, to accommodate deflections of the aircraft body 24. To ensure smooth relative sliding movement between the bearing beams 32 and support beam 38', the under surfaces of the ends of the support beam 38' preferably have Teflon (trademark) pads 72 attached thereto. The midportion of the support beam 38' preferably has a bearing block removably attached thereto similar to the bearing blocks 44 which are attached to the support beams 38 within the modules 30. As can be seen in FIG. 4, the side guides 40 of adjacent modules 30 are not directly connected to each other. A gap between adjacent side guides 40 and the shoulder bolts 47 attaching the vertical restraints 46' to the guides 40 accommodate aircraft deflection. The use of a slip joint 68 instead of a gap between adjacent bearing beams 32 is preferable so that the modules 30 will support each other under lateral loads.

The cargo tray 80 invention is shown in FIGS. 3 and 6-11 is the subject of the applicant's aforementioned application Ser. No. 069,518. The tray 80 has a bottom wall 84, a substantially rectangular flat horizontal peripheral lip 106, opposite end walls 88, and opposite sidewalls 86 that slope downwardly and inwardly from the lip 106 to the bottom wall 84 to conform the configuration of the tray 80 and cargo carried thereby to the compartment sidewalls 6. See FIG. 8. In the preferred embodiment shown in the drawings, the tray 80 has an outer shell 82 and an inner shell 90. The shells 82, 90 may be formed from metal but are preferably formed from molded plastic to minimize their cost and weight.

Figure 9:
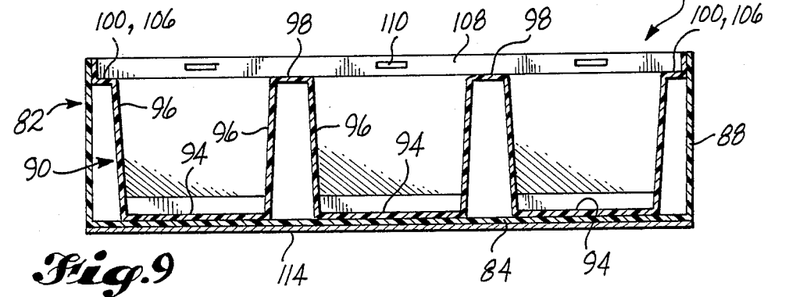
FIG. 9 is a sectional view taken along the line 9—9 in FIG. 6.
Figures 10, 11:
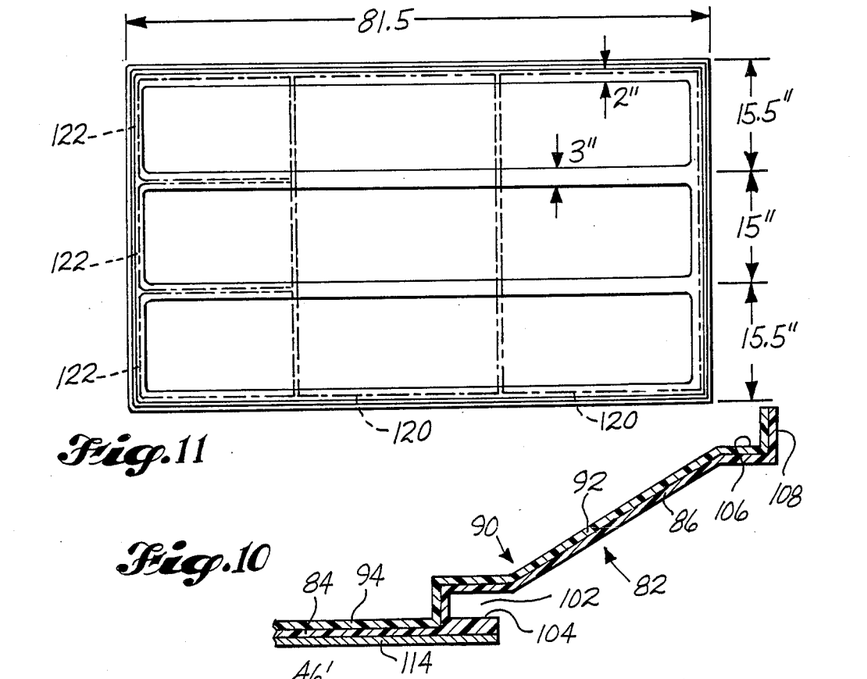
FIG. 10 is a sectional view taken along the line 10—10 in FIG. 6.
FIG. 11 is a top plan view of the tray and load shown in FIGS. 6-8, with the straps omitted and the boxes shown in broken lines.

As best seen in FIG. 10, the outer shell 82 has a bottom wall, end walls, and sloping sidewalls that form the bottom wall 84, end walls 88, and sloping sidewalls 86 of the tray 80. Preferably, an aluminum sheet 114 is bonded or fastened to the underside of bottom wall 84 to improve resistance to surface wear. A slot 102 extends along the lower portion of each of the sidewalls 86. An extension of the bottom wall 84 defines the bottom of the slot 102 and forms an upwardly facing shoulder 104. The slot 102 is positioned and dimensioned to receive vertical restraint members, such as the aluminum plates 46, 46' described above. As shown in FIG. 10, the outer shell 82 extends integrally in a horizontal direction from the top of each sidewall 86 along the horizontal lip 106 and then extends vertically upwardly. As shown in FIG. 9, the end walls 88 of the outer shell 82 are essentially vertical and extend down to the bottom wall 84. Together, the bottom wall 84, sidewalls 86, and end walls 88 form a tub-like body enclosed on its bottom, sides, and ends and open on its top. The upper portions of the end walls 88 and the vertical upper portions of the sides of the outer shell 82 form the outer portion of a vertical projection or lip 108 which extends upwardly from the outer periphery of the horizontal lip 106.

Figures 6, 7:
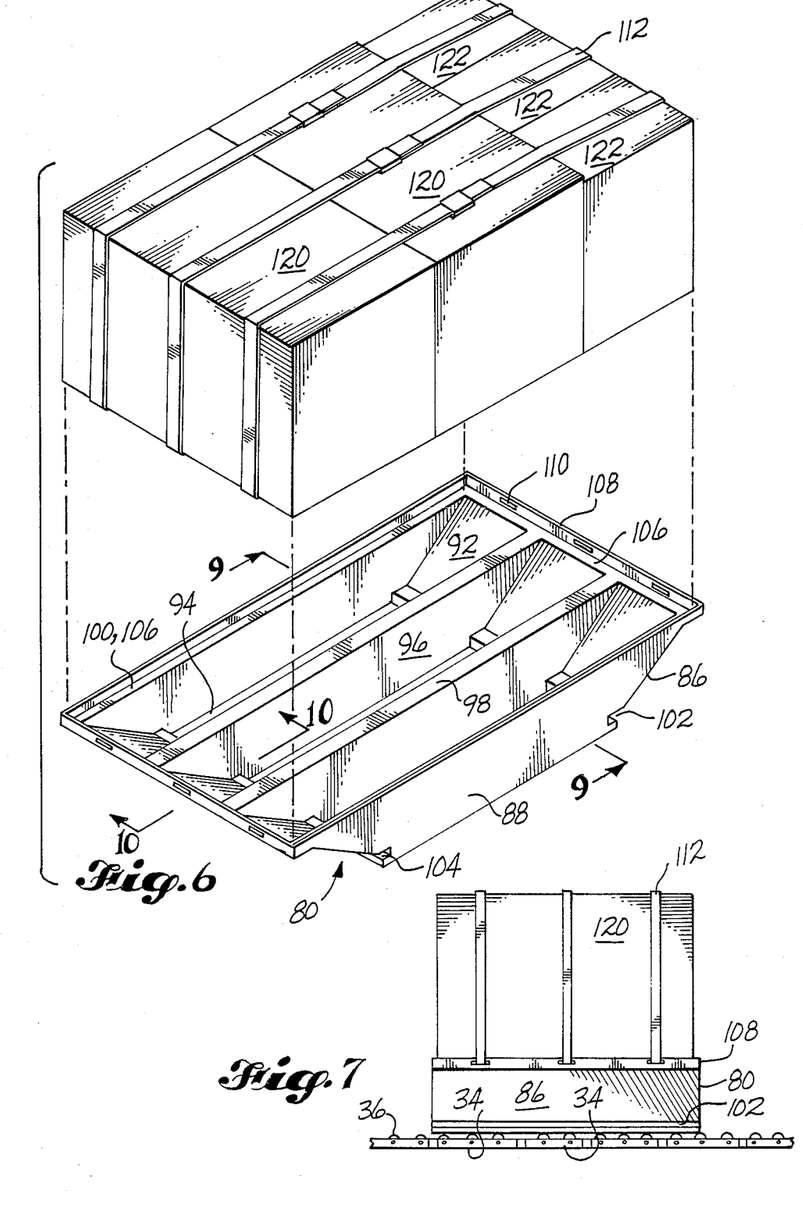
FIG. 6 is a pictorial view of the cargo tray shown in FIG. 3 and a typical loading arrangement, with the load shown separated from the tray.
FIG. 7 is a side view of the tray and load shown in FIG. 6, with the load in position on the tray and the tray being supported by the system of the invention.

As best seen in FIGS. 6 and 9, the inner shell 90 has a corrugated configuration with a plurality of valleys 94 and a plurality of ridges 98. The bottom walls 94 of the valleys are secured to the inner surfaces of the bottom wall 84 of the outer shell 82. The flat top walls 98 of the ridges extend between opposite sides of the lip 106 and form support surfaces, described further below. The bottom walls 94 and top walls 98 are connected by generally vertical walls 96. At each end of the tray, the inner shell 90 forms a partial ridge having an upper surface 100 that defines an end portion (laterally extending portion) of the horizontal lip 106. In addition to providing support surface 98, 100, the corrugated configuration gives the tray 80 lateral beam strength.

Referring to FIG. 10, the sidewalls 92 of the inner shell 90 have a sloping configuration corresponding to the configuration of the outer shell sidewalls 86. The inner and outer shells 82, 90 are secured together along their sidewalls 86, 92, including the portions defining the slot 102, and along the side portions of the horizontal and vertical lips 106, 108. As shown in FIG. 9, the ends of the two shells 80, 92 are secured together along the vertical lip 108. The shells 80, 92 are preferably secured together by adhesive bonding.

The top surface of the horizontal lip 106 and the top surfaces 98 of the inner shell ridges are coplanar and form support surfaces for boxes of cargo. The lip 106 and ridge support surfaces 98 are positioned and dimensioned to provide spans between adjacent support surfaces 98 and between the lip 106 and adjacent support surfaces 98 that are less than a minimum dimension of rectangular boxes with various standardized dimensions. This dimensioning ensures that standard size boxes placed on the tray 80 will be supported by at least two support surfaces 98, 106. The tray 80 preferably includes means for securing boxes placed thereon. In the preferred embodiment shown in the drawings, slots 110 are formed in the side portions of the vertical lip 108 for receiving the ends of straps 112, which may be sewn or riveted to secure them to the lip 108. The vertical lip 108 itself also helps to restrain cargo and facilitates loading of the tray 80. The generally vertical walls 96 of the ridges 98 and partial ridges define spaces therebetween for receiving items of cargo smaller than the standardized boxes. These spaces are between and below the coplanar lip 106 and support surfaces 98, 100, 106, and thus, positioning of cargo in the spaces does not impede loading of boxes on the tray 80.

Various systems for standardizing cargo box sizes have been proposed. It is currently anticipated that the tray of the invention will be dimensioned to accommodate boxes made in accordance with the system described in "Intermodal Modules for Transport", Document D6-34500-R2 of The Boeing Commercial Airplane Company, dated November 1984. A cargo tray for use in the lower cargo compartments of standard body width aircraft can readily be dimensioned to accommodate the IM-30 size box described in the cited Boeing document. The basic IM-30 module has outer dimensions of about 30"×45"×58". The system also includes smaller boxes which are even subdivisions of the basic box size. The smaller boxes have dimensions of 30"×45"×29", 30"×22.5"×29", and 15"×22.5"×29".

The preferred dimensioning of the tray 80 and the spans between its support surfaces 98, 106 for accommodating the IM-30 system boxes are illustrated in FIG. 11. The spans between the support surfaces 98, 106 are 12", less than the smallest standard dimension of 15". Various configurations of boxes may be loaded onto the tray 80. A typical configuration is shown in FIGS. 6 and 11. This configuration includes two half-sized boxes 120 with dimensions of 30"×45"×29" and three ⅛th sized boxes 122 with dimensions of 15"×22.5"×29". As can be seen in FIG. 11, each of the boxes 120, 122 has at least two edges supported by a support surface 98, 106.

As noted above, a cargo tray 80 positioned on a module 30 of the cargo conveyor and restraint system is preferably restrained from longitudinal movement by means of side locks or latches carried by the side guides 40. Various types of latches may be employed. One type of latch that is suitable for use in the system of the invention is illustrated in FIGS. 4 and 12-14. As shown in FIG. 4, the lock 48 is installed in the tubular body of the side guide 40 and has a stop member 52 which extends horizontally therefrom when the lock 48 is in a lock position to restrain longitudinal movement of a cargo tray 80 or other cargo unit positioned on the module 30.

Figure 12:
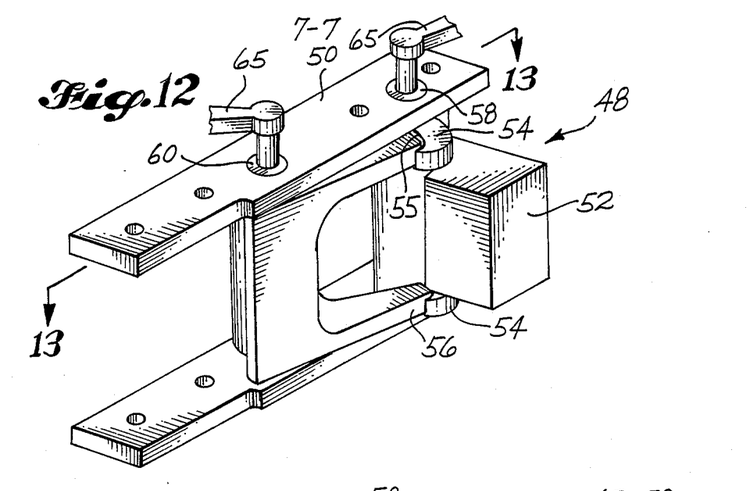
FIG. 12 is a pictorial view of the preferred embodiment of the longitudinal restraint latch.
Figure 13:
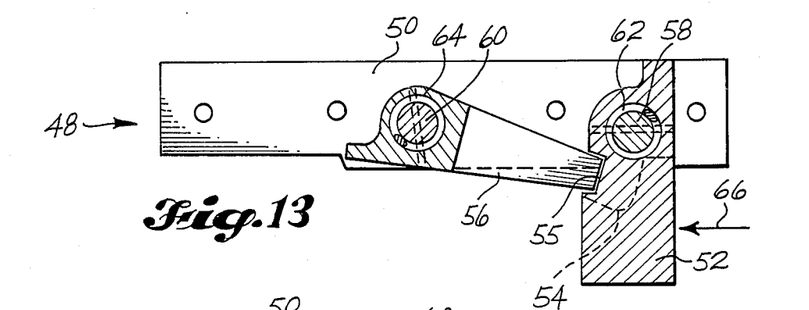
FIG. 13 is a sectional view taken along the line 13—13 in FIG. 12.
Figure 14:
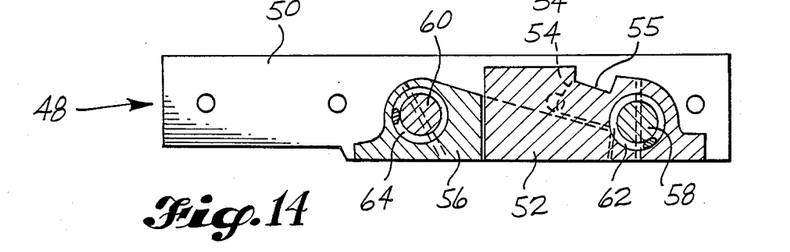
FIG. 14 is like FIG. 13 except that it shows the latch in a disengaged position.

Referring to FIGS. 12-14, a channel 50 forms the body of the lock 48 and provides means for attaching the lock 48 to the side guide 40. The stop member 52 is pivotably mounted to the channel 50 by means of a pivot pin 58. An ear 54 is formed on each of the upper and lower ends of the stop member 52. Each ear 54 defines a recess 55. A keeper yoke 56 is pivotably mounted to the channel 50 by means of a pivot pin 60. FIGS. 4, 12, and 13 show the stop member 52 in its locked position in which it extends horizontally outwardly from the channel 50. In this position, the ends of the two arms of the keeper yoke 56 are received into the recesses 55 in the ears 54 of the stop member 52 to lock the stop member 52 in position. The load direction is indicated by the arrow 66 in FIG. 13. A torsion spring 62 biases the stop member 52 toward its closed nonuse position shown in FIG. 14. In this position, both the stop member 52 and the yoke 56 are flush with the vertical surface of the side guide 40, and the arms of the yoke 56 are adjacent to the outer surfaces of the ears 54. A second torsion spring 64 biases the keeper yoke 56 inwardly toward its flush position shown in FIG. 14.

In order to engage the lock 48, an operator pivots the stop member 52 out with one hand and pivots the keeper yoke 56 into position with the other hand. Disengaging the lock 48 is accomplished simply by pivoting the stop member 52 outwardly a small amount in a direction opposite to the load direction 66. This movement of the stop member 52 releases the arms of the keeper yoke 56 from the recesses 55. Then, the stop member 52 is released, and the springs 62, 64 move the stop member 52 and the yoke 56 into their closed flush positions shown in FIG. 14. Preferably, handles 65 are provided to facilitate movement of the stop member 52 and the yoke 56 by an operator.

It will be obvious to those skilled in the art to which this invention is addressed that the invention may be used to advantage in a variety of situations. Therefore, it is also to be understood by those skilled in the art that various modifications and omissions in form and detail may be made without departing from the spirit and scope of the invention as defined by the following claims.

What is claimed is:

1. In an aircraft compartment of the type having a floor and a plurality of anchor fittings mounted in the floor, a cargo conveyor and restraint system comprising a plurality of sections each of which includes a plurality of laterally extending, longitudinally aligned bearing beams for distributing cargo loads over the floor; a plurality of roller trays secured to and extending longitudinally between the bearing beams; at least one tie-down support beam laterally offset from the roller trays and secured to and extending longitudinally between adjacent bearing beams, said support beam including means for securing the section to the anchor fittings; and restraint means for restraining horizontal and vertical movement of cargo units positioned on the section.

2. A system as described in claim 1, in which there are two parallel longitudinally extending rows of sections, and which comprises slip joint means connecting the sections in each row to each other.

3. A system as described in claim 2, in which each section comprises longitudinally extending side guide means secured to outboard end portions of the bearing beams.

4. A system as described in claim 2, in which each section comprises a longitudinally extending side guide secured to an outboard end portion of each bearing beam.

5. A system as described in claim 3, in which the restraint means includes means carried by the side guide means for restraining longitudinal and vertical movement of cargo units positioned on the section.

6. A system as described in claim 4, in which the restraint means includes means carried by the side guide for restraining longitudinal and vertical movement of cargo units positioned on the section.

7. A system as described in claim 1, in which the roller trays are spaced above the floor; and which further comprises bearing block means removably attached to underside portions of the bearing beams and the tie-down support beam to transmit loads from the bearing beams and the tie-down support beam to the floor, said bearing block means being compressible under abnormal loads to help absorb abnormal loads.

8. A system as described in claim 2, in which the roller trays are spaced above the floor; and which further comprises bearing block means removably attached to underside portions of the bearing beams and the tie-down support beam to transmit loads from the bearing beams and the tie-down support beam to the floor, said bearing block means being compressible under abnormal loads to help absorb abnormal loads.

9. A system as described in claim 3, in which the roller trays and the side guide means are spaced above the floor; and which further comprises bearing block means removably attached to underside portions of the bearing beams and the tie-down support beam to transmit loads from the bearing beams and the tie-down support beam to the floor, said bearing block means being compressible under abnormal loads to help absorb abnormal loads.

10. A system as described in claim 4, in which the roller trays and the side guide are spaced above the floor; and which further comprises bearing block means removably attached to underside portions of the bearing beams and the tie-down support beam to transmit loads from the bearing beams and the tie-down support beam to the floor, said bearing block means being compressible under abnormal loads to help absorb abnormal loads.

11. A system as described in claim 5, in which the roller trays and the side guide means are spaced above the floor; and which further comprises bearing block means removably attached to underside portions of the bearing beams and the tie-down support beam to transmit loads from the bearing beams and the tie-down support beam to the floor, said bearing block means being compressible under abnormal loads to help absorb abnormal loads.

12. A system as described in claim 6, in which the roller trays and the side guide are spaced above the floor; and which further comprises bearing block means removably attached to underside portions of the bearing beams and the tie-down support beam to transmit loads from the bearing beams and the tie-down support beam to the floor, said bearing block means being compressible under abnormal loads to help absorb abnormal loads.

* * * * *